US007835322B2

(12) United States Patent
Yu et al.

(10) Patent No.: US 7,835,322 B2
(45) Date of Patent: Nov. 16, 2010

(54) APPARATUS AND METHOD FOR DATA TRANSMISSION/RECEPTION IN MOBILE TELECOMMUNICATION SYSTEM

(75) Inventors: Jae-Chon Yu, Suwon-si (KR); Hwan-Joon Kwon, Suwon-si (KR); Beom-Sik Bae, Suwon-si (KR); Kyung-Joo Suh, Seoul (KR); Dong-Hee Kim, Yongin-si (KR); Jin-Kyu Han, Seoul (KR); Yeon-Ju Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 516 days.

(21) Appl. No.: 11/871,575

(22) Filed: Oct. 12, 2007

(65) Prior Publication Data

US 2008/0205334 A1    Aug. 28, 2008

(30) Foreign Application Priority Data

Oct. 12, 2006    (KR) ...................... 10-2006-0099568

(51) Int. Cl.
  *H04W 4/00*    (2009.01)
(52) U.S. Cl. ...................................... 370/329; 370/344
(58) Field of Classification Search ................. 370/206, 370/328, 329, 330, 338, 352, 344, 431, 436, 370/468
See application file for complete search history.

(56) References Cited

U.S. PATENT DOCUMENTS

2004/0120347 A1    6/2004    Lee et al.
2005/0185725 A1    8/2005    Maeda et al.
2006/0105761 A1    5/2006    Walton et al.
2006/0171295 A1    8/2006    Ihm et al.
2007/0038629 A1*   2/2007    Vinh et al. ...................... 707/9
2007/0171861 A1*   7/2007    Akhtar ....................... 370/329
2008/0062936 A1*   3/2008    He et al. ...................... 370/338
2008/0062944 A1*   3/2008    Smith et al. .................. 370/342
2008/0071910 A1*   3/2008    Thukral ....................... 709/226

\* cited by examiner

*Primary Examiner*—Brian D Nguyen
(74) *Attorney, Agent, or Firm*—The Farrell Law Firm, LLP

(57) ABSTRACT

Disclosed is an apparatus and method for data transmission/reception in a mobile telecommunication system, and more particularly to an apparatus and method for data transmission/reception in a mobile telecommunication system employing an Orthogonal Frequency Division Multiplexing (OFDM) scheme. The method includes identifying a CHannel IDentifier (CH_ID), which represents a first resource indicated by a Forward Shared Control CHannel (F-SCCH) among all resources; identifying a second resource indicated by resource assignment information for group terminals; and when the first resource includes all or a part of the second resource, and a third resource unused by the group terminals exists in the entire or part of the second resource, transmitting/receiving data by means of the third resource and a fourth resource, which is a remaining part of the first resource excluding the second resource.

18 Claims, 7 Drawing Sheets

APPARATUS AND METHOD FOR DATA TRANSMISSION/RECEPTION IN MOBILE TELECOMMUNICATION SYSTEM

PRIORITY

This application claims priority to application entitled "Apparatus And Method For Data Transmission/Reception In Mobile Telecommunication System" filed with the Korean Intellectual Property Office on Oct. 12, 2006 and assigned Serial No. 2006-99568, the contents of which are incorporated herein by reference.

BACKGROUND OF THE INVENTION

1. Field of the Invention

The present invention relates to a wireless communication system, and more particularly to an apparatus and method for data transmission/reception in a mobile telecommunication system.

2. Description of the Related Art

In general, wireless communication systems have been developed for terminals that cannot be connected to a fixed wired network. The representative wireless communication systems include mobile telecommunication systems, for example, a Wireless Local Area Network (LAN) system, a Wireless Broadband Internet (WiBro) system, a Mobile Ad Hoc system, an Ultra Mobile Broadband (UMB) system, etc. Different from normal wireless communication systems, the mobile communication system is based on the mobility of the user. The ultimate object of the mobile telecommunication system is to enable information media to be exchanged through a Mobile Station (MS), such as a mobile phone, a Personal Digital Assistant (PDA), and a wireless pager, regardless of time and space, that is, regardless of "when," "where," and "to whom." With the rapid development of communication technology, current mobile telecommunication systems are providing not only ordinary voice communication services, but also high rate data services which enable transmission of large-capacity digital data, such as moving images, as well as the transmission of e-mail or still images, by using a mobile station.

One representative example of current mobile telecommunication systems providing high rate data services is an Orthogonal Frequency Division Multiplexing (OFDM) system. According to the transmission scheme of the OFDM system, a serially-input symbol sequence is converted into parallel signals, and the parallel signals are transmitted through a plurality of mutually orthogonal subcarriers. The OFDM scheme has come into the spotlight since the beginning of the 1990's, according to the development of the Very Large Scale Integration (VLSI) technology.

According to the OFDM scheme, data is modulated by means of multiple subcarriers, and the sub-carriers maintain the orthogonality between them, so that the OFDM scheme is more robust against frequency selective multipath fading channel, and is more proper for the high rate packet data services, such as a broadcasting service, than the existing single carrier modulation scheme.

Generally, the OFDM system may classify Voice over IP (VoIP) users into a plurality of groups according to different distances from a base station and manage the VoIP users according to each group in order to efficiently support the VoIP users.

With respect to the VoIP users grouped as described above, resources are assigned by transmitting one message to each group, instead of transmitting one Forward Link Assignment Message (FLAM) to each user.

Through such a method, the general OFDM system can prevent the base station from using a large amount of power in order to enable all users to see FLAMs transmitted through a Forward link Shared Control CHannel (F-SCCH).

Resources assigned to group users by a specified message can be recognized through a bitmap. Through such a bitmap, each definite resource, that is, one Block Resource Channel (BRCH) or one Distributed Resource CHannel (DRCH), is assigned to each user. However, the method of grouping the users by means of a bitmap has a problem in that resources assigned to the groups are not fully used by the group users.

SUMMARY OF THE INVENTION

Accordingly, the present invention has been made to solve at least the above-mentioned problems occurring in the prior art, and the present invention provides a method and apparatus for data transmission/reception in a mobile telecommunication system.

In addition, the present invention provides a method and apparatus for enabling unused resources, among resources assigned to group users, to be used by a non-group user in a mobile telecommunication system employing an Orthogonal Frequency Division Multiplexing (OFDM) scheme.

In accordance with an aspect of the present invention, there is provided a method for transmitting/receiving data in a mobile telecommunication system, the method includes identifying a CHannel IDentifier (CH_ID), which represents a first resource indicated by a Forward Shared Control CHannel (F-SCCH) among all resources; identifying a second resource indicated by resource assignment information for group terminals; and when the first resource includes an entire or a part of the second resource, and a third resource unused by the group terminals exists in the entire or part of the second resource, transmitting/receiving data by means of the third resource and a fourth resource which is a remaining part of the first resource, excluding the second resource.

In accordance with another aspect of the present invention, there is provided an apparatus for transmitting/receiving data in a mobile telecommunication system, the apparatus includes a resource assignment controller for identifying a CHannel IDentifier (CH_ID), which represents a first resource indicated by a Forward Shared Control CHannel (F-SCCH) among all resources, identifying a second resource indicated by resource assignment information for group terminals, and determining data to be transmitted or received through a third resource unused by the group terminals among an entire or a part of the second resource and through a fourth resource which is a remaining part of the first resource, excluding the second resource, when the first resource includes the entire or part of the second resource, and the third resource exists; and a module for transmitting or receiving data by means of the third resource and the fourth resource, which is the remaining part of the first resource, excluding the second resource.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, one exemplary embodiment of the present invention will be described with reference to the accompanying drawings. In the following description, a detailed description of known functions and configurations incorporated herein will be omitted when it may obscure the subject matter of the present invention.

According to the present invention, when there are resources unused by a group of users, among resources assigned to the group of users, in an Orthogonal Frequency Division Multiplexing (OFDM) scheme, non-group users can use the unused resources.

Figure 1:
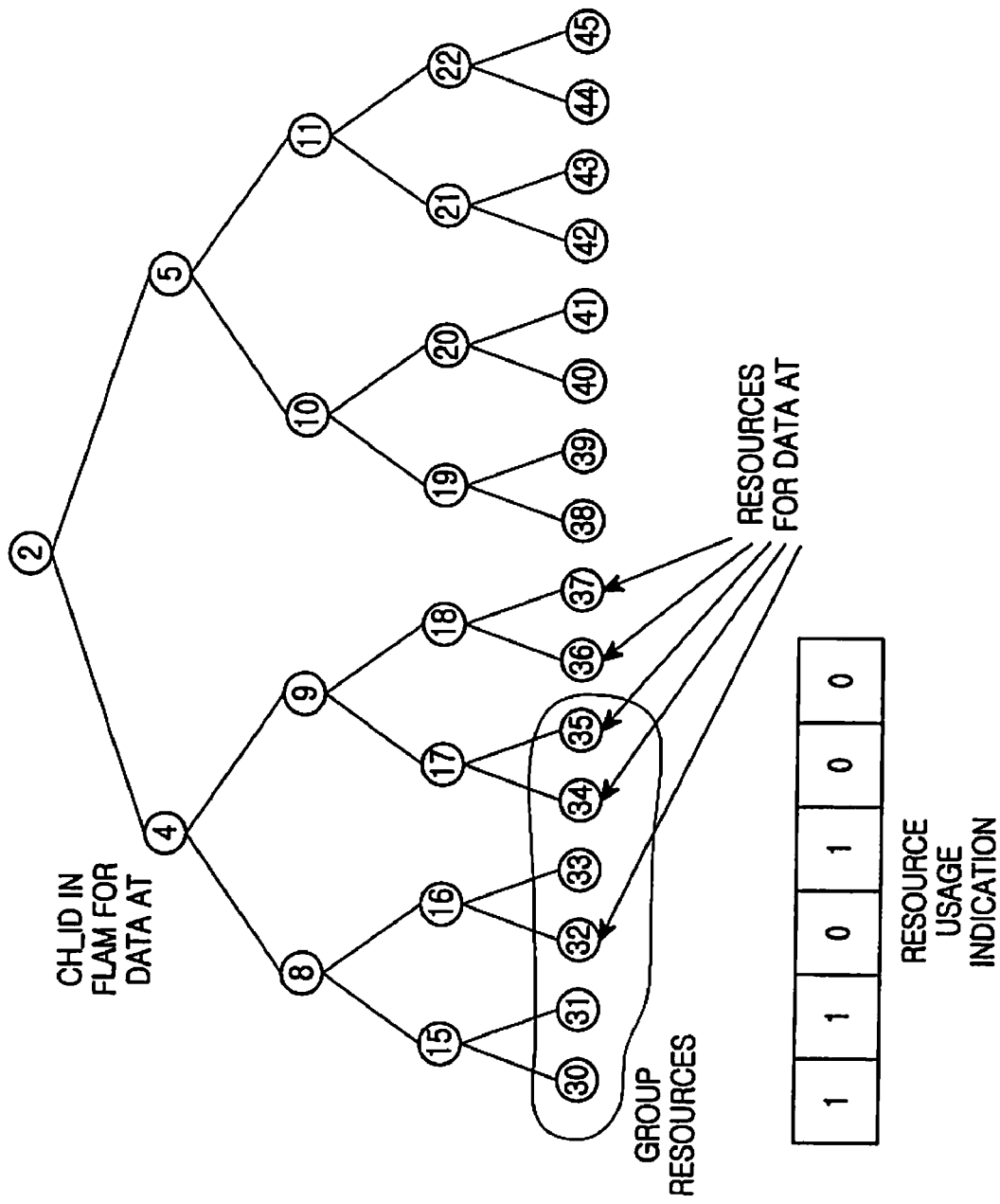
FIG. 1 is a diagram illustrating a basic concept of assigning unused resources, among resources assigned to group users, and other resources to a data user, which is not included in the group, according to an exemplary embodiment of the present invention.

FIG. 1 is a diagram illustrating a basic concept of assigning unused resources, among resources assigned to Voice over IP (VoIP) group users, and other resources to non-group Access Terminals (ATs) according to an exemplary embodiment of the present invention. In the following description, each user included in a group will be referred to as a "group AT" or "group user," and each user not included in the group will be referred to as a "data AT" or "data user."

Hereinafter, the present invention will be described with respect to group ATs using a VoIP service as an example.

FIG. 1 illustrates the basic concept of the present invention. The VoIP group users can recognize that resources #30 to #35 have been assigned, through a received resource assignment message. In addition, the group users can recognize that resources #30, #31, and #33, from among resources #30 to #35, are being used by the group users, through a received bitmap. Therefore, resources #32, #34, and #35 are unused by the group Ats and may exist non-consecutively according to the bitmap, as shown in FIG. 1.

It is assumed in FIG. 1 that a data user is assigned with CHannel ID (CH_ID) #4 through a Forward Link Assignment Message (FLAM), which is transmitted through a Forward link Shared Control CHannel (F-SCCH) from a network. The data user assigned with CH_ID #4 from the network uses resources #36 and #37 as a basis, and additionally can recognize that resources #32, #34, and #35, among resources #30 to #35 assigned to the group users, have not been used by checking a received bitmap.

Since the data user has recognized in advance that the group users have been assigned with resources #30 to #35, and can receive the bitmap as the group users do, the data user can identify the positions of unused resources from among the resources assigned to the group users.

Figure 2:
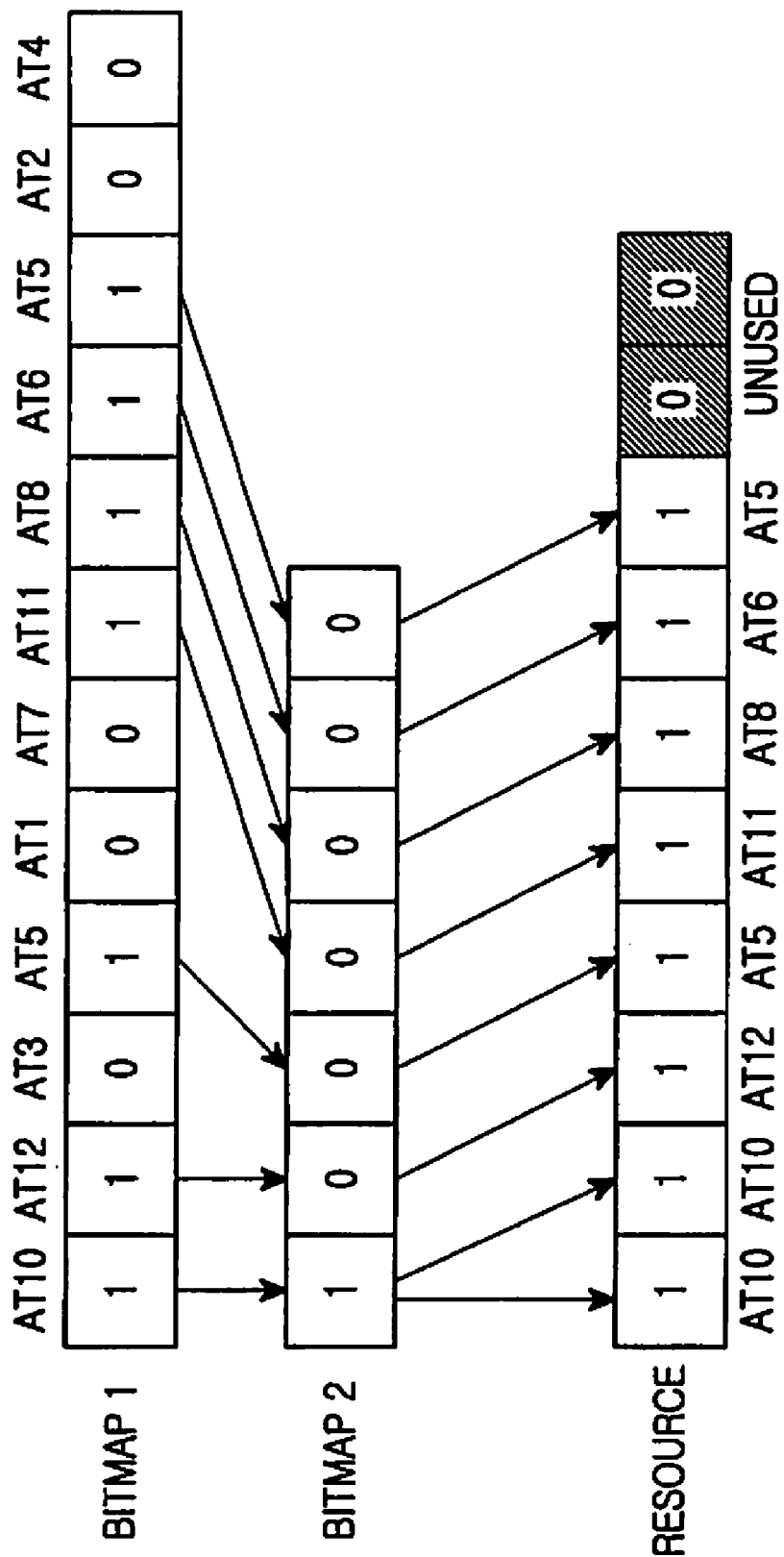
FIG. 2 is a diagram illustrating a bitmap scheme in which consecutively unused resources among resources assigned to group users are indicated according to an exemplary embodiment of the present invention.

FIG. 2 is a diagram illustrating a bitmap scheme in which consecutively unused resources among resources assigned to group users are indicated according to an exemplary embodiment of the present invention. In Bitmap 1, AT10, AT12, AT3, AT5, AT1, AT7, AT11, AT8, AT6, AT5, AT2, and AT4, which on a one-to-one basis correspond to bits, represent group ATs.

Each bit value in Bitmap 1 represents whether each corresponding group AT is in an active state or an inactive state, in which a bit value of "1" represents that a corresponding AT uses one or more resources in order to transmit or to receive data, and a bit value of "0" represents that a corresponding AT does not use any resource to transmit or to receive data.

Bitmap 2 represents the number of resources assigned to each AT which is in the active state in Bitmap 1. In Bitmap 2, a bit value of "0" represents that a corresponding AT in the active state uses one resource, and a bit value of "1" represents that a corresponding AT in the active state uses two resources. Therefore, according to an exemplary embodiment of the present invention, it is possible to assign the resources on a one-by-one basis to the group ATs in the active state among the group ATs by means of Bitmaps 1 and 2, so that resources unused by the group ATs exist consecutively.

Accordingly, the data AT can recognize unused resources among resources assigned to group ATs through Bitmaps 1 and 2, as shown in FIG. 2.

Figure 3:
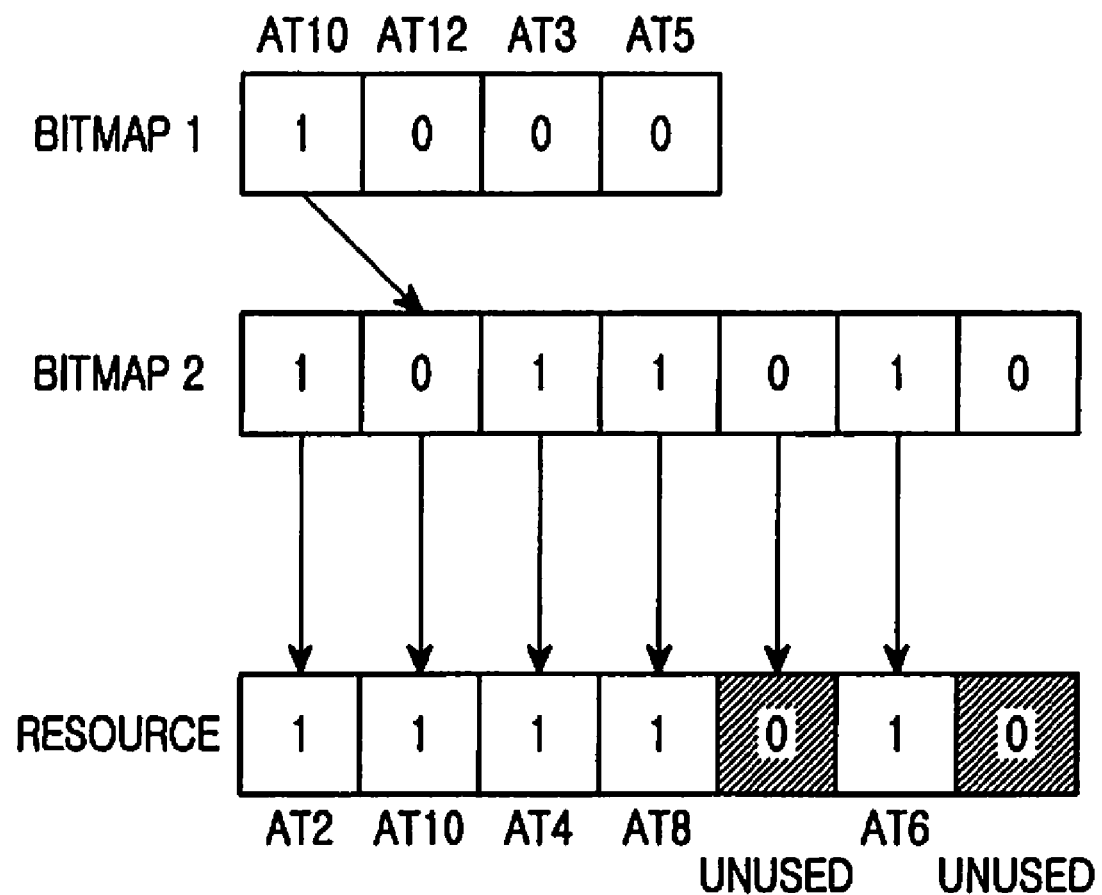
FIG. 3 is a diagram illustrating a bitmap scheme in which non-consecutively unused resources among resources assigned to group users are indicated according to an exemplary embodiment of the present invention.

FIG. 3 is a diagram illustrating a bitmap scheme in which non-consecutively unused resources among resources assigned to group users are indicated according to an exemplary embodiment of the present invention. According to FIG. 3, unused resources among resources assigned to group ATs may be reported in a scheme other than that shown in FIG. 2.

In Bitmap 1 of FIG. 3, each bit value represents whether a group AT is currently assigned a new resource. In Bitmap 1, a bit value of "1" represents that a corresponding group AT is currently assigned a new resource, and a bit value of "0" represents that a corresponding terminal is not currently assigned a new resource. That is, Bitmap 1 illustrates a case where AT10 is currently assigned a new resource, and AT12, AT3, and AT5 are not currently assigned a new resource.

Bitmap 2 in FIG. 3 represents whether or not resources are currently being used. That is, in Bitmap 2, a bit value of "1" represents that a corresponding resource is currently being used, and a bit value of "0" represents that a corresponding resource is not currently being used. AT10, which is assigned a new resource through Bitmap 1, as described above, checks Bitmap 2 and uses a second resource, which is represented by a first "0," among currently-unused resources represented by "0." Used resources in Bitmap 2 may be resources used by either a user of a terminal assigned with a resource in advance in connection with current Bitmap 1, or resources used by other users.

Hereinafter, the configuration and operation of a transmitting apparatus according to an exemplary embodiment of the present invention will be described with reference to FIGS. 4 and 5.

Figure 4:
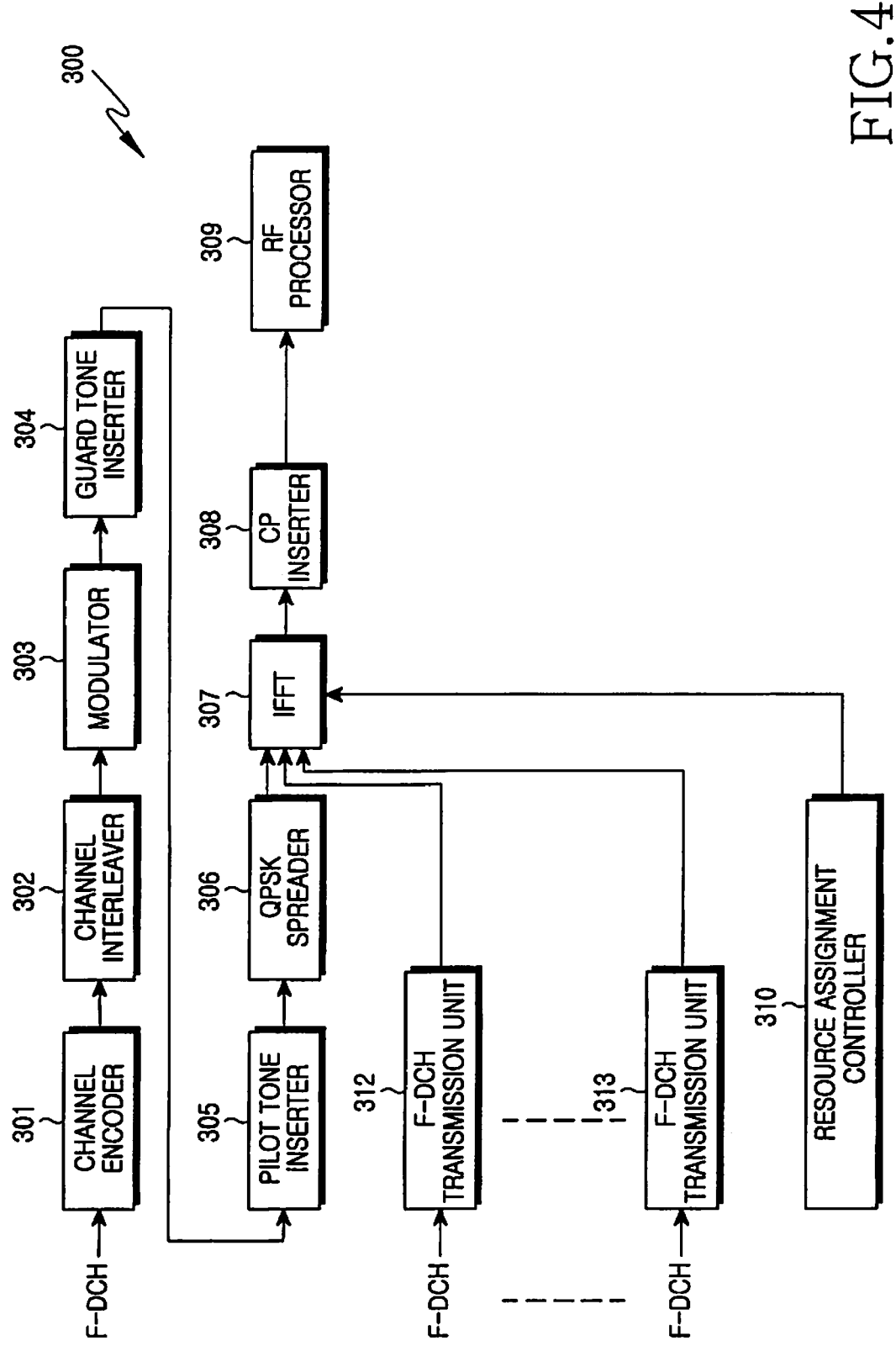
FIG. 4 is a block diagram illustrating the configuration of a transmitting apparatus in an OFDM system according to an exemplary embodiment of the present invention.

First, FIG. 4 is a block diagram illustrating the configuration of a transmitting apparatus 300 in an OFDM system according to an exemplary embodiment of the present invention.

The transmitting apparatus 300 includes a transmission module for generating a Forward Data CHannel (F-DCH) as OFDM symbols and transmitting the OFDM symbols, in which the transmission module includes components indicated by reference numerals 301 to 309. The symbols of F-DCHs of multiple users are multiplexed and subjected to an Inverse Fast Fourier Transform (IFFT) in an IFFT processor 307. When the multiplexing is performed in the IFFT processor 307, resource assignment for each user is performed under the control of a resource assignment controller 310. The resource assignment controller 310 determines which resource is to be assigned to which user, and this information is transferred to a receiving side by an FLAM transmitted through an F-SCCH. The transmission module includes a channel encoder 301 for encoding packet data of a control channel received from a physical layer (not shown), a channel interleaver 302 for interleaving the encoded packet data, a modulator 303 for modulating the interleaved packet data, a guard tone inserter 304 for inserting guard tones in order to reduce the influence of interference by the signals out of the band, and a pilot tone inserter 305 for inserting pilot tones for channel estimation in an access terminal.

The transmission module also includes a Quadrature Phase Shift Keying (QPSK) spreader 306 for spreading an OFDM signal in a QPSK scheme, the IFFT processor 307 for converting a time-domain signal into a frequency-domain signal, a Cyclic Prefix (CP) inserter 308 for inserting a CP into a front part of OFDM data in order to prevent signal interference, and an RF processor 309 for converting the OFDM data, into which the CP has been inserted, into an RF signal by frequency-up conversion. In FIG. 4, the channel encoder 301, the channel interleaver 302, the modulator 303, the guard tone inserter 304, the pilot tone inserter 305, and the QPSK spreader 306 in the transmission module are designated as an "F-DCH transmission unit," as indicated by reference numerals 312 and 313, and there may be as many F-DCH transmission units as there are users or resources.

According to an exemplary embodiment of the present invention, the resource assignment controller 310 identifies resources assigned to a data user, other than a group user, through a CH_ID, and determines if resources indicated by the CH_ID include a resource assigned to group users. When the resources indicated by the CH_ID include no resource assigned to the group users, the resource assignment controller 310 uses the resources indicated by the CH_ID as resources for data transmission. In contrast, when the resources indicated by the CH_ID include a resource assigned to the group users, the resource assignment controller 310 determines if there is a resource unused by the group users among resources assigned to the group users. When there are no resources unused by the group users among resources assigned to the group users, resources, except for resources assigned to the group users, among the resources indicated by the CH_ID, are used as resources for data transmission.

In contrast, when the resources indicated by the CH_ID include a resource assigned to the group users, and there is a resource unused by the group users among resources assigned to the group users, the resource unused by the group users, together with resources not assigned to the group users among the resources indicated by the CH_ID, are used as resources for data transmission.

Figure 5:
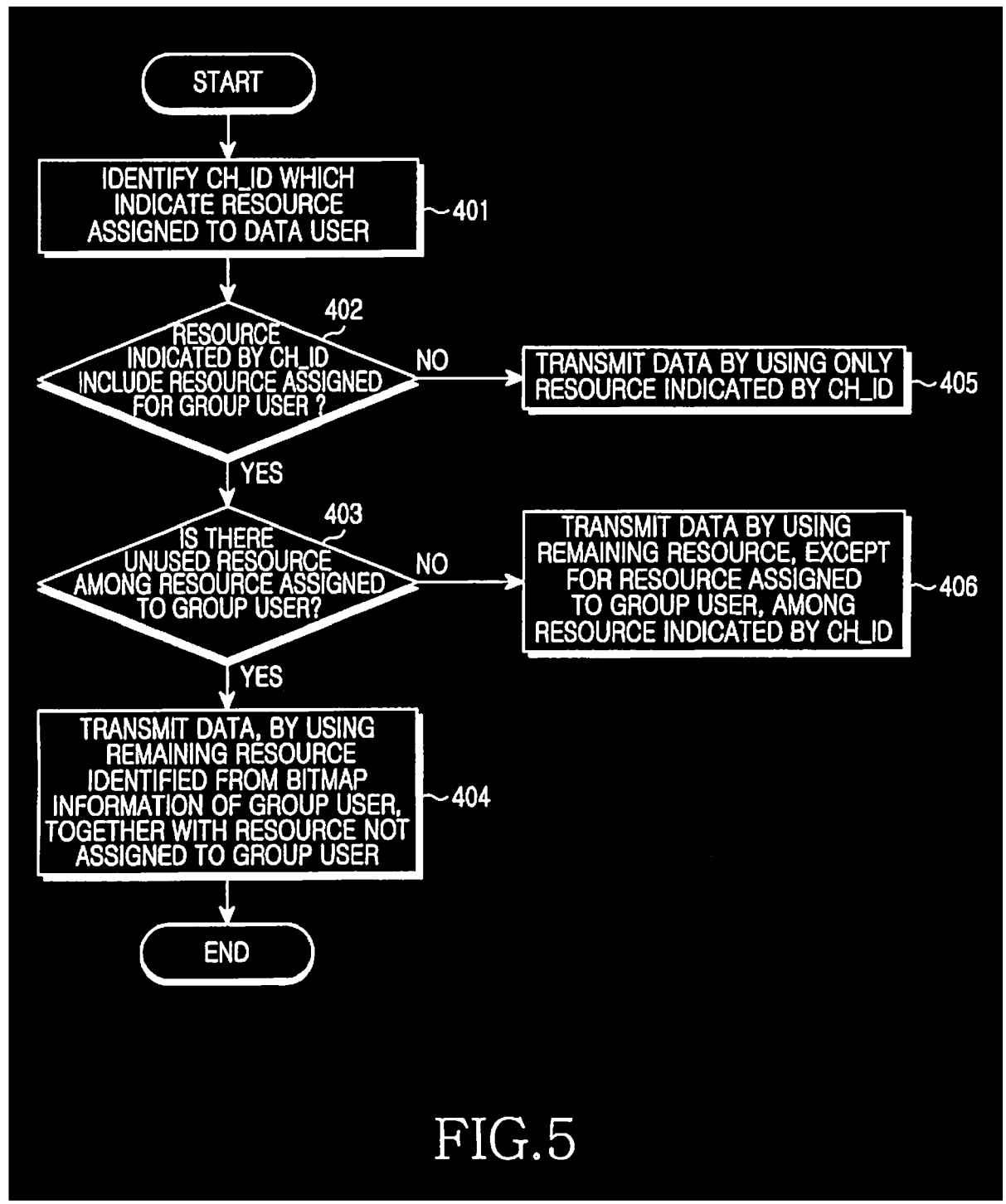
FIG. 5 is a flowchart illustrating a procedure in which a transmitting apparatus transmits data by sharing resources that are unused by group users among resources assigned to the group users with a data user in an OFDM system according to an exemplary embodiment of the present invention.

FIG. 5 is a flowchart illustrating a procedure in which a transmitting apparatus transmits data by sharing resources unused by group users among resources assigned to the group users with a data user other than the group users, in an OFDM system according to an exemplary embodiment of the present invention. First, in step 401, the transmitting apparatus checks a CH_ID which indicates resources assigned to a data user. Then, in step 402, the transmitting apparatus determines if the resources assigned to the data user include a resource assigned to group users. When it is determined in step 402 that the resources assigned to the data user does not include any resources assigned to the group users, the transmitting apparatus proceeds to step 405, in which the transmitting apparatus transmits data by means of the resources indicated by the CH_ID. In contrast, when it is determined in step 402 that the resources indicated by the CH_ID include a resource assigned to the group users, the transmitting apparatus proceeds to step 403, in which the transmitting apparatus determines if there is a resource unused by the group users among the resources assigned to the group users by using bitmaps. When it is determined in step 403 that there are no resources unused by the group users, the transmitting apparatus proceeds to step 406, in which the transmitting apparatus transmits data by using resources, except for resources assigned to the group users, among the resources indicated by the CH_ID.

In contrast, when it is determined in step 403 that there is at least one resource unused by the group users among the resources assigned to the group users, the transmitting apparatus proceeds to step 404, in which the transmitting apparatus transmits data by using the unused resource among the resources assigned to the group users, together with resources not assigned to the group users among the resources indicated by the CH_ID.

Hereinafter, the configuration and operation of a receiving apparatus according to an exemplary embodiment of the present invention will be described with reference to FIGS. 6 and 7.

Figure 6:
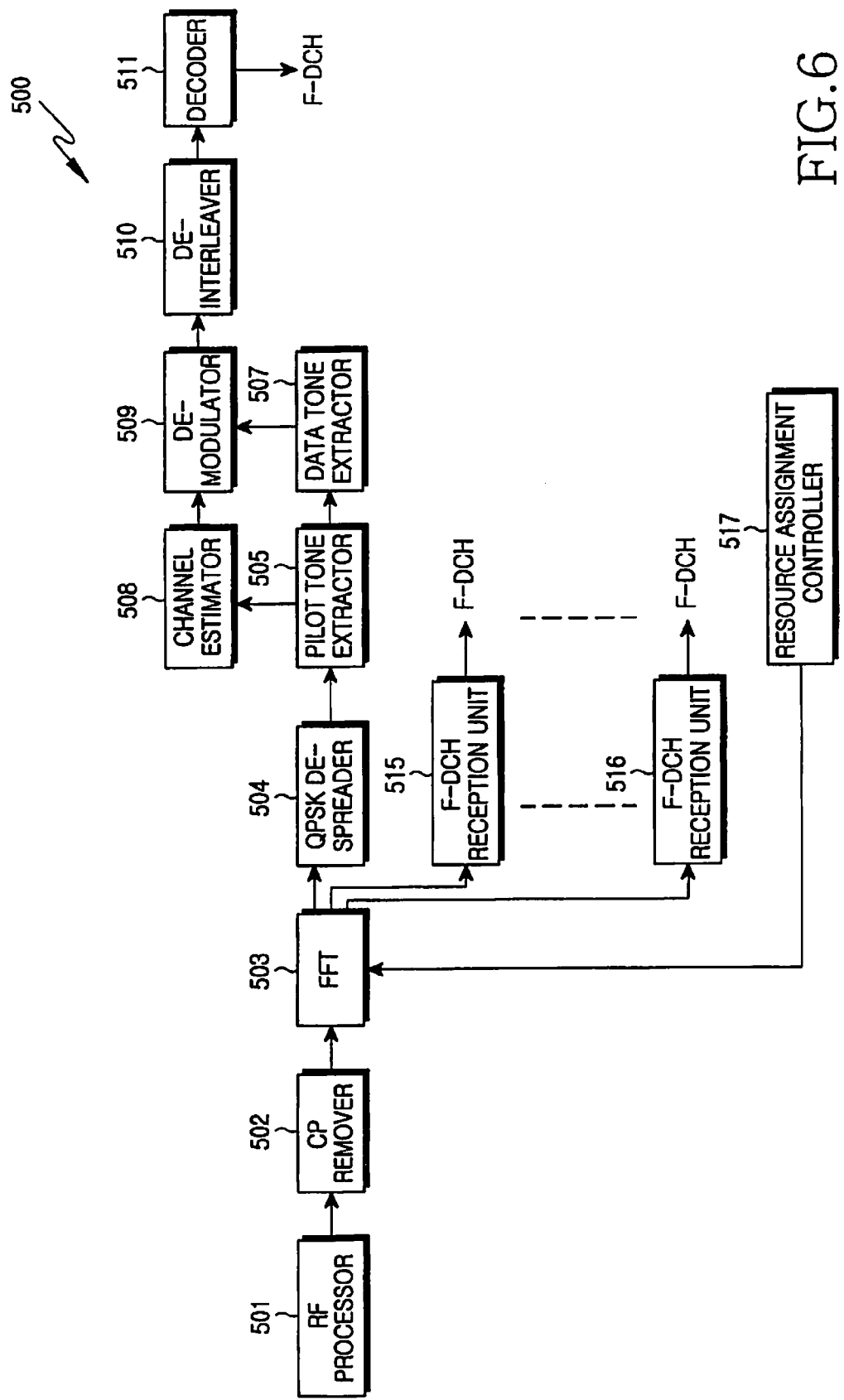
FIG. 6 is a block diagram illustrating the configuration of a receiving apparatus in an OFDM system according to an exemplary embodiment of the present invention.

FIG. 6 is a block diagram illustrating the configuration of a receiving apparatus 500 in an OFDM system according to an exemplary embodiment of the present invention.

The receiving apparatus 500 includes a reception module 501 to 511 for receiving an OFDM signal from a wireless network and restoring the OFDM signal to packet data, in which the reception module includes components indicated by reference numerals 501 to 511. A resource assignment controller 517 assigns frequency-domain tones, which have passed through a Fast Fourier Transform (FFT) processor 503, to F-DCH reception units 515 and 516 for each user. In the reception module, an RF processor 501 converts a signal received from a wireless network into a baseband signal, and then converts the baseband signal into a digital signal. The digital signal obtained through the RF processor 501 is output to a CP remover 502. The CP remover 502 eliminates a CP contaminated due to the propagation delay, the multi-path, etc., from the digital signal. The FFT processor 503 converts a received time-domain signal, from which the CP has been eliminated, into a frequency-domain signal, and outputs the frequency-domain signal. A QPSK de-spreader 504 de-spreads the frequency-domain OFDM signal in the QPSK scheme and outputs tones of each signal. This is based on an assumption that the signal transmitted by the transmitting apparatus is QPSK-spread before being transmitted. Therefore, when the transmitting apparatus uses a different spreading scheme, the receiving apparatus is equipped with a de-spreader corresponding to the used spreading scheme.

Also, in the reception module, the QPSK de-spreader 504 transfers the de-spread tones of each signal to a pilot tone extractor 505. The pilot tone extractor 505 extracts pilot tones from the tones of each signal, transfers the extracted pilot tones to a channel estimator 508, and transfers signal tones, from which the pilot tones have been eliminated, to a data tone extractor 507. The data tone extractor 507 extracts data tones from the input signal tones, and transfers the extracted data tones to a demodulator 509. The channel estimator 508 estimates a channel by means of the pilot tones, and outputs the channel-estimation value to the demodulator 509. The demodulator 509 demodulates the data tones by using the channel-estimation value input from the channel estimator 508. The demodulated signal is de-interleaved by a de-interleaver 510 and is then input to a decoder 511. The decoder 511 decodes the input signal, thereby restoring the originally transmitted signal. The reception module including components indicated by reference numerals 504 to 511 will be referred to as an "F-DCH reception unit."

According to an exemplary embodiment of the present invention, the resource assignment controller 517 identifies resources assigned to a data user through a CH_ID, and determines if resources indicated by the CH_ID include a resource assigned to group users. When the resources indicated by the CH_ID do not include resources assigned to the group users, the resource assignment controller 517 uses the resources indicated by the CH_ID as resources for data reception.

In contrast, when the resources indicated by the CH_ID include a resource assigned to the group users, the resource assignment controller 517 determines if there is a resource unused by the group users among resources assigned to the group users. When there are no resources unused by the group users among resources assigned to the group users, resources, except for resources assigned to the group users, among the resources indicated by the CH_ID, are used as resources for data reception.

In contrast, when the resources indicated by the CH_ID include a resource assigned to the group users, and there is a resource unused by the group users among resources assigned to the group users, the resource unused by the group users, together with resources not assigned to the group users among the resources indicated by the CH_ID, are used as resources for data reception.

As described above, the signal of each user is again assigned with resources by the resource assignment controller 517, and each bit of data is received through the F-DCH reception units 515 and 516 corresponding to each user.

Figure 7:
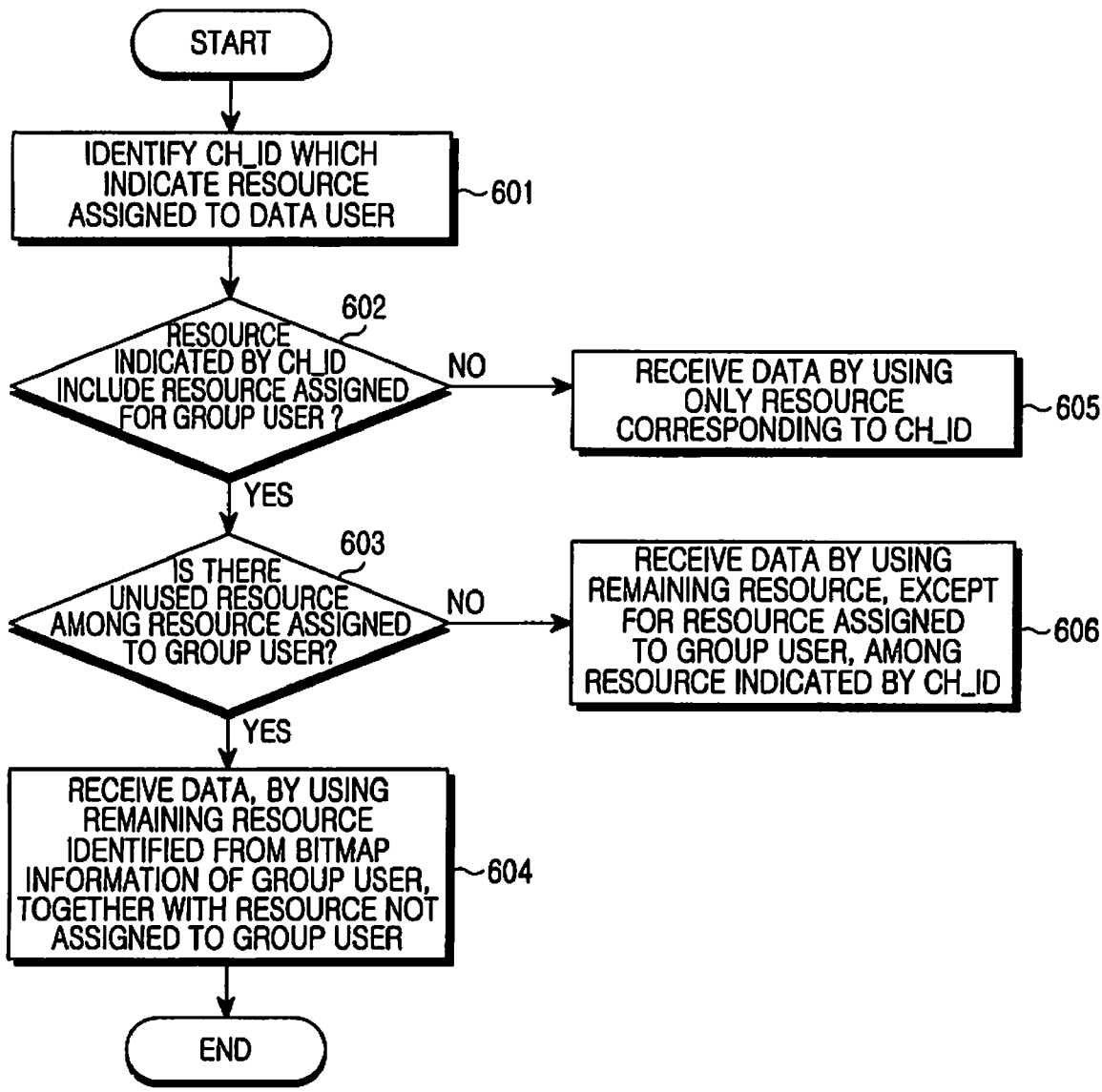
FIG. 7 is a flowchart illustrating a procedure in which a receiving apparatus receives data by sharing resources that are unused by group users among resources assigned to the group users with a data user who does not belong to the group users in an OFDM system according to an exemplary embodiment of the present invention.

FIG. 7 is a flowchart illustrating a procedure in which a receiving apparatus 500 receives data through resources unused by group users among resources assigned to the group users by sharing the unused resources with a data user who does not belong to the group users in an OFDM system according to an exemplary embodiment of the present invention. First, in step 601, the receiving apparatus 500 checks a CH_ID which indicates resources assigned to a data user. Then, in step 602, the receiving apparatus 500 determines if the resources assigned to the data user, which are indicated by the CH_ID, include a resource assigned to group users. When it is determined that the resources assigned to the data user do not include resources assigned to the group users, the receiving apparatus 500 proceeds to step 605, in which the receiving apparatus 500 receives data by means of the resources indicated by the CH_ID.

In contrast, when it is determined in step 602 that the resources indicated by the CH_ID include a resource assigned to the group users, the receiving apparatus 500 proceeds to step 603, in which the receiving apparatus 500 determines if there is a resource unused by the group users among the resources assigned to the group users by using bitmaps. When it is determined in step 603 that there are no resources unused by the group users, the receiving apparatus 500 proceeds to step 606, in which the receiving apparatus 500 receives data by using resources, except for resources assigned to the group users, among the resources indicated by the CH_ID. In contrast, when it is determined in step 603 that there is a resource unused by the group users among the resources assigned to the group users, the receiving apparatus 500 proceeds to step 604, in which the receiving apparatus 500 receives data by using the resource unused by the group users among the resources assigned to the group users, together with resources, except for all the resources assigned to the group users, among all the resources assigned to the data user.

While the present invention has been shown and described with reference to certain exemplary embodiments thereof, it will be understood by those skilled in the art that various changes in form and details may be made therein without departing from the spirit and scope of the invention as defined by the appended claims. For example, the patterns of the pilot tones and the PDR values described with reference to FIGS. 5 to 7 is only an example, and the present invention is applicable to various types of patterns and settings. Accordingly, the scope of the invention is not to be limited by the above embodiments but by the claims and the equivalents thereof.

As described above, according to the present invention, a data user shares resources assigned to group users in an OFDM system, thereby using resources which normally remain unused.

What is claimed is:

1. A method for transmitting/receiving data in a mobile telecommunication system, the method comprising the steps of:
    identifying a CHannel IDentifier (CH_ID), which represents a first resource indicated by a Forward Shared Control CHannel (F-SCCH);
    identifying a second resource indicated by resource assignment information for group terminals; and
    when the first resource includes at least part of the second resource, and a third resource unused by the group terminals exists in the at least part of the second resource, transmitting/receiving data by means of the third resource and a fourth resource, which is a remaining part of the first resource excluding the second resource.

2. The method as claimed in claim 1, wherein the CH_ID is included in a Forward Link Assignment Message (FLAM) transmitted through the F-SCCH, and is transmitted to a data terminal.

3. The method as claimed in claim 1, wherein the resource assignment information includes a first bitmap for individually indicating at least one terminal to transmit or to receive data from among the group terminals, and a second bitmap for indicating a number of consecutive resources assigned to the terminal indicated by the first bitmap.

4. The method as claimed in claim 1, wherein the resource assignment information includes a first bitmap for indicating at least one terminal assigned with a new resource among the group terminals, and a second bitmap for indicating a location of a resource which the terminal indicated by the first bitmap is to use.

5. The method as claimed in claim 1, wherein the CH_ID represents a resource at a specific location among resources arranged in a tree structure.

6. The method as claimed in claim 1, further comprising determining data to be transmitted or received using the first resource, when the first resource does not include all or part of the second resource.

7. The method as claimed in claim 1, further comprising determining data to be transmitted or received using the fourth resource, of the first resource, when the third resource does not exist.

8. The method as claimed in claim 1, wherein the data is for a terminal other than the group terminals.

9. The method as claimed in claim 1, wherein the group terminals comprise Voice-over-IP terminals.

10. An apparatus for transmitting/receiving data in a mobile telecommunication system, the apparatus comprising:
   a resource assignment controller for identifying a CHannel IDentifier (CH_ID), which represents a first resource indicated by a Forward Shared Control CHannel (F-SCCH), identifying a second resource indicated by resource assignment information for group terminals, and determining data to be transmitted or received using a third resource unused by the group terminals among at least part of the second resource and using a fourth resource, which is a remaining part of the first resource excluding the second resource, when the first resource includes the at least part of the second resource, and the third resource exists; and
   a module for transmitting or receiving data by means of the third resource and the fourth resource.

11. The apparatus as claimed in claim 10, wherein the CH_ID is included in a Forward Link Assignment Message (FLAM) transmitted through the F-SCCH, and is received by a data terminal.

12. The apparatus as claimed in claim 10, wherein the resource assignment information comprises:
   a first bitmap for individually indicating at least one terminal to transmit or to receive data from among the group terminals; and
   a second bitmap for indicating a number of consecutive resources assigned to the terminal indicated by the first bitmap.

13. The apparatus as claimed in claim 10, wherein the resource assignment information comprises:
   a first bitmap for indicating a terminal assigned with a new resource among the group terminals; and
   a second bitmap for indicating a location of a resource which the terminal indicated by the first bitmap is to use.

14. The apparatus as claimed in claim 10, wherein the CH_ID represents a resource at a specific location among resources arranged in a tree structure.

15. The apparatus as claimed in claim 10, wherein when the first resource does not include all or part of the second resource, the resource assignment controller controls the module to transmit or receive data using the first resource.

16. The apparatus as claimed in claim 10, wherein when the third resource does not exist, the resource assignment controller controls the module to transmit or receive data using the fourth resource.

17. The apparatus as claimed in claim 10, wherein the group terminals comprise Voice-over-IP (VoIP) terminals.

18. The apparatus as claimed in claim 10, wherein the data is for a terminal other than the group terminals.

* * * * *